(12) United States Patent
Winzell et al.

(10) Patent No.: US 11,769,411 B2
(45) Date of Patent: Sep. 26, 2023

(54) SYSTEMS AND METHODS FOR PROTECTING VULNERABLE ROAD USERS

(71) Applicant: Volvo Car Corporation, Gothenburg (SE)

(72) Inventors: Peter Winzell, Mountain View, CA (US); Jonas Fenn, San Francisco, CA (US)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 17/138,976

(22) Filed: Dec. 31, 2020

(65) Prior Publication Data
US 2022/0208006 A1 Jun. 30, 2022

(51) Int. Cl.
*G08G 1/16* (2006.01)
*G08G 1/01* (2006.01)
*H04L 67/12* (2022.01)
*H04W 4/029* (2018.01)
*H04L 69/18* (2022.01)
*H04W 4/44* (2018.01)

(52) U.S. Cl.
CPC .......... *G08G 1/162* (2013.01); *G08G 1/0141* (2013.01); *H04L 67/12* (2013.01); *H04L 69/18* (2013.01); *H04W 4/029* (2018.02); *H04W 4/44* (2018.02)

(58) Field of Classification Search
CPC ...... G08G 1/162; G08G 1/0141; H04L 67/12; H04L 69/18; H04W 4/029; H04W 4/44
See application file for complete search history.

(56) References Cited

U.S. PATENT DOCUMENTS

| | | | |
|---|---|---|---|
| 2012/0042046 A1* | 2/2012 | Petersen | H04W 4/029 709/219 |
| 2017/0256147 A1* | 9/2017 | Shanahan | G08G 1/162 |
| 2018/0075747 A1* | 3/2018 | Pahwa | B60W 40/10 |

* cited by examiner

*Primary Examiner* — James J Yang
(74) *Attorney, Agent, or Firm* — Clements Bernard Walker; Christopher L. Bernard (57) ABSTRACT

The present disclosure provides a set of tools that enable traffic safety developments across multiple participants and industries, with location and other safety related data being shared in an anonymized fashion. Specifically, a location based server is provided that implements a vulnerable road user protocol. This vulnerable road user protocol avoids the use of global vehicle identification numbers and does not utilize persistent storage for such information, thereby mitigating location based privacy concerns. Further, the present disclosure provides a "hybrid" simulation engine that can be used to tailor and provide specific road user alerts, and specifies a risk assessment module that acts as a logic for quantifying the risk level associated with each unique road user relationship. Finally, the present disclosure provides an alert methodology for certain vulnerable road users based on noise-cancelling headphone and 3D audio algorithm technologies.

20 Claims, 7 Drawing Sheets

SYSTEMS AND METHODS FOR PROTECTING VULNERABLE ROAD USERS

TECHNICAL FIELD

The present disclosure relates generally to the transportation and automotive fields. More particularly, the present disclosure relates to systems and methods for protecting vulnerable road users.

BACKGROUND

The problem of traffic safety has been around as long as traffic has existed. The seat belt was an early solution to protecting vehicle occupants during a collision, followed by the air bag, and finally collision avoidance and mitigation systems. Technologies enabling the "connected vehicle" introduced multiple concepts for sharing location data among traffic participants in order to prevent collisions. Most such technologies utilize databases to store location data and are developed for a specific use, e.g., a traffic control center. Such solutions have yet to scale openly across actors in the traffic and infrastructure sectors. It is common that these solutions are halted due to privacy legislation and/or general reluctance to share information within and across industries.

It should be noted that this background is provided as illustrative context and environment only. It will be readily apparent to those of ordinary skill in the art that the principles of the present disclosure may be applied in other contexts and environments equally.

SUMMARY

The present disclosure provides a set of tools that enable traffic safety developments across multiple participants and industries, with location and other safety related data being shared in an anonymized fashion. Specifically, a location based server is provided that implements a vulnerable road user protocol. This vulnerable road user protocol avoids the use of global vehicle identification numbers (VINs) and does not utilize persistent storage for such information, thereby mitigating location based privacy concerns. Further, the present disclosure provides a "hybrid" simulation engine that can be used to tailor and provide specific road user alerts, and specifies a risk assessment module that acts as a logic for quantifying the risk level associated with each unique road user relationship. Finally, the present disclosure provides an alert methodology for certain vulnerable road users based on noise-cancelling headphone and 3D audio algorithm technologies. Collectively, the anonymized tools and vulnerable road user protocol, simulation engine, and risk assessment and alert methodology form a "connected safety" system that has not previously been available.

In one illustrative embodiment, the present disclosure provides a method for distributing road user information, including: at a central server, receiving road user type, road user position, and timestamp data from a road user via protocol that omits road user identification information; and, from the central server, distributing the received road user type, road user position, and timestamp data to another road user via the protocol that omits road user identification information; wherein use of the protocol that omits road user identification information enables persistent storage and dissemination of the road user type, road user position, and timestamp data without storage and dissemination of the road user identification. Optionally, the protocol that omits road user identification information is carried via another protocol over an established network. The road user includes one of a vehicle, a device associated with a pedestrian, a device associated with a biker, etc. The road user position data includes global positioning system coordinates, network triangulation data, etc. Optionally, the road user type data is provided automatically by one of hardware and software associated with the road user. Optionally, the method further includes combining the road user type, road user position, and timestamp data with other road user type, road user position, and timestamp data to simulate a collision alert scenario. Optionally, the road user type, road user position, and timestamp data received by the other road user to perform a local collision risk assessment and issue a corresponding local alert.

In another illustrative embodiment, the present disclosure provides a method for performing an impact risk assessment using road user information, including: at a vehicle or device, receiving road user type, road user position, and timestamp data for a plurality of road users from a central server via a protocol that omits road user identification information; and locally, at the vehicle or device, determining a risk of impact between each of the plurality of road users and the vehicle or device using the road user type, road user position, and timestamp data for the plurality of road users and a known position of the vehicle or device. The method further includes, at the vehicle or device, receiving one or more of road condition and weather information for an area including the plurality of road users; and locally, at the vehicle or device, determining the risk of impact between each of the plurality of road users and the vehicle or device using the road user type, road user position, and timestamp data, the one or more of the road condition and weather information, and the known position of the vehicle or device. The method further includes locally, at the vehicle or device, determining a risk of impact between combinations of the plurality of road users using the road user type, road user position, and timestamp data. Optionally, the protocol that omits road user identification information is carried via another protocol over an established network. The device includes one of a device associated with a pedestrian, a device associated with a biker, etc. The road user includes one of a vehicle, a device associated with a pedestrian, a device associated with a biker, etc. The road user position data includes global positioning system coordinates, network triangulation data, etc. Optionally, the road user type data is provided automatically by one of hardware and software associated with the road user. The method further includes, based on a result of the determining the risk of impact, issuing a corresponding local alert at the vehicle or device warning of an impending impact.

In a further illustrative embodiment, the present disclosure provides a method for issuing an impending impact alert using road user information, including: at a vehicle or device, receiving road user type, road user position, and timestamp data for a plurality of road users from a central server via a protocol that omits road user identification information; locally, at the vehicle or device, determining a risk of impact between each of the plurality of road users and the vehicle or device using the road user type, road user position, and timestamp data for the plurality of road users and a known position of the vehicle or device; and based on a result of the determining the risk of impact, issuing a corresponding local alert at the vehicle or device warning of an impending impact. The method further includes, at the vehicle or device, receiving one or more of road condition and weather information for an area including the plurality of road users; and locally, at the vehicle or device, determining the risk of impact between each of the plurality of road users and the vehicle or device using the road user type, road user position, and timestamp data, the one or more of the road condition and weather information, and the known position of the vehicle or device. One or more of an audio characteristic and a visual characteristics of the local alert is/are provided with one or more of a directionality indicator and an urgency indicator based on the received road user position data for the plurality of road users. The directionality indicator includes one or more of a directional audio tone and a directional visual display.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF ILLUSTRATIVE EMBODIMENTS

Again, the present disclosure provides a set of tools that enable traffic safety developments across multiple participants and industries, with location and other safety related data being shared in an anonymized fashion. Specifically, a location based server is provided that implements a vulnerable road user protocol. This vulnerable road user protocol avoids the use of global VINs and does not utilize persistent storage for such information, thereby mitigating location based privacy concerns. Further, the present disclosure provides a "hybrid" simulation engine that can be used to tailor and provide specific road user alerts, and specifies a risk assessment module that acts as a logic for quantifying the risk level associated with each unique road user relationship. Finally, the present disclosure provides an alert methodology for certain vulnerable road users based on noise-cancelling headphone and 3D audio algorithm technologies. Collectively, the anonymized tools and vulnerable road user protocol, simulation engine, and risk assessment and alert methodology form a "connected safety" system that has not previously been available Roads are a shared resource where vehicles and vulnerable road users, such as pedestrians and bikers, need to be aware of each other's proximity in order to preserve safety.

The present disclosure thus provides a means to build systems that protect road users, and is particularly aimed at protecting vulnerable road users. Further, the present disclosure provides a set of tools to further develop and tailor solutions for safe road usage. The present disclosure utilizes location based data—exemplified by global positioning system (GPS) coordinates—as the foundation for position identification in time. However, it should be understood that these GPS coordinates could be replaced by any other positioning identifier. The present disclosure provides a location based server together with a vulnerable road user protocol (VRUP), whereby road users communicating using the VRUP can be made aware of potential dangers within their proximity. The VRUP avoids the use of global VINs and does not need persistent storage, thereby mitigating location based privacy concerns. Further, the present disclosure provides a "hybrid" simulation engine that, in conjunction with the location based server and by adopting the VRUP, can be used to tailor specific road user alerts. This simulation engine is essential to developing such systems in a safe and controlled manner. The present disclosure further specifies a risk assessment module that acts as a logic for quantifying the risk level associated with each unique road user relationship. Finally, the present disclosure provides an alert methodology for certain vulnerable road users based on noise-cancelling headphone and 3D audio algorithm technologies.

Figure 1:
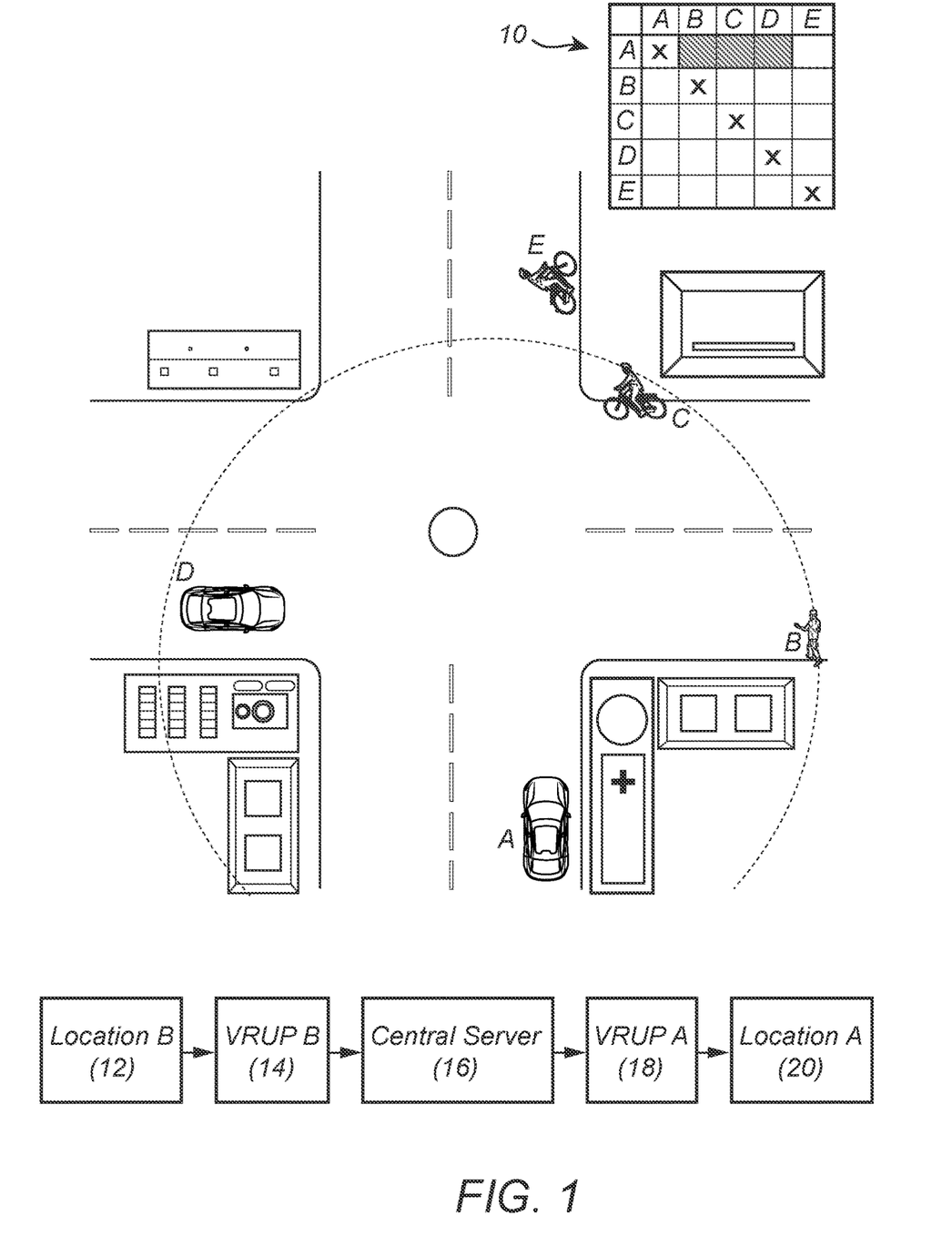
FIG. 1 is a schematic diagram illustrating a road location, i.e., an intersection, including a plurality of road users.

FIG. 1 is a schematic diagram illustrating a road location, i.e., an intersection, including a plurality of road users—vehicle A, pedestrian B, biker C, vehicle D, and biker E. These road users can preferably transmit their location data to a central location and to one another via an anonymous protocol, such that collisions may be avoided, for example. A risk assessment module 10 is also illustrated, showing the potential interactions between the various road users. As is illustrated, pedestrian B communicates its location 12 to a central server 16 using anonymized the anonymized VRUP 14. This location data is then available to vehicle A at its location 20, with vehicle A also communicating its location 20 to the central server 16 using anonymized the anonymized VRUP 18. Information from the risk assessment module 10 is also available to all road users and used to deliver appropriate interaction alerts.

The VRUP is designed to be agnostic of transport type using the JSON format, for example. It is important to not to tie the solution to a specific transport protocol, as there must be interoperability across devices and networks, and the solution is intended to be adaptable to any means of transport now or in the future. HTTP is one illustrative example. The VRUP implements "get" and "set" methods. Where the "get" method returns a result, the "set" method only provides the server 16 with vulnerable road user data. The purpose for two different methods is to be able to send simulated data without having to burden networks with unnecessary replies.

Definition

RU—road users
VEHICLE: sedans, sport utility vehicles, smaller trucks
HEAVY_VEHICLE: trucks over 4.5 tons, HVNL
BIKER: road bikers, scooters, skaters
PEDESTRIAN: walking, jogging
VISUALLY_IMPAIRED: special case of pedestrians
EBIKER: electric bikes, e-scooters, e-skateboards, etc.
MOTORCYCLE: motorcycles, scooters The "get" method is used to provide the location server 16 with a road user's position and to provide a list of nearby road users and their positions within a certain distance, d, from the road user. This method returns to the caller a list of nearby road users within a radius of d meters, for example.

```
"action":"get"
"request-data:"{*}"
request-data*:
"guid": <global universal identifier as specified by RFC4122>
"type": <one of RU>
"gps": <lat,long,alt>
"distance": <proximity radius in meters>
"timestamp": <time when request was made in unix time in milliseconds>
"data": <use case depending> 'optional string, can be used to calculate z
    in the risk assessment module as well'
Returns
{
  [{
    "guid": <global universal identifier>
    "gps": <[lat,long,alt]>
    "data": <optional>
    "type": <one of RU>
    "timestamp": <unix time in milliseconds when recorded by server>
    "data" <use case depending> 'optional string'
  },
  ...
  ]
}
```

The "set" method only provides the server 16 with vulnerable road user data.

"action":"set"
"data-post": {*}
data-post*
"guid": <global universal identifier as specified by RFC4122>
"type": <one of RU>
"gps": <lat,long,alt>
"data": <case depending>'optional string'
"timestamp": <unix time in milliseconds when post was made>

Again, there are two different VRUP actions or commands: "get" and "set." Here, VRUP over HTTP is illustrated:

```
url : https://locationserver/vrup?VRUP_ACTION=vrup_json_payload
vrup_json_payload: {"action":"get",
    "type":"BIKE",
        "gps":[{"lat": 37.386339,"long": -122.040848}],
        "distance":500,
            "guid": AA97B177-9383-4934-8543-0F91A7A02836
        "data":{ }
        "timestamp": 1608735807440
}
response:{"rus":[{"type":"VEHICLE",
    "gps":[{"lat": 37.386335,"long": -122.040844}],
        "guid": AA97B177-9383-4934-8543-0F91A7A02831
        "timestamp": 1608735807441
        "data":{ }
    },
    ...
    ]
}
vrup_json_payload: {"action":"set",
    "type":"BIKE",
        "gps":[{"lat": 37.386339,"long": -122.040848}],
            "guid": AA97B177-9383-4934-8543-0F91A7A02833
        "data":{ }
        "timestamp": 1608735807442
}
response: <HTTP 200 OK>
```

To connect, clients need to specify an address, protocol, and port when using bi-directional transport.

Ex, Connect("url","wss","443")
VRUP over HTTP Example<TODO>
VRUP over MQTT Example<TODO>

Figure 2:
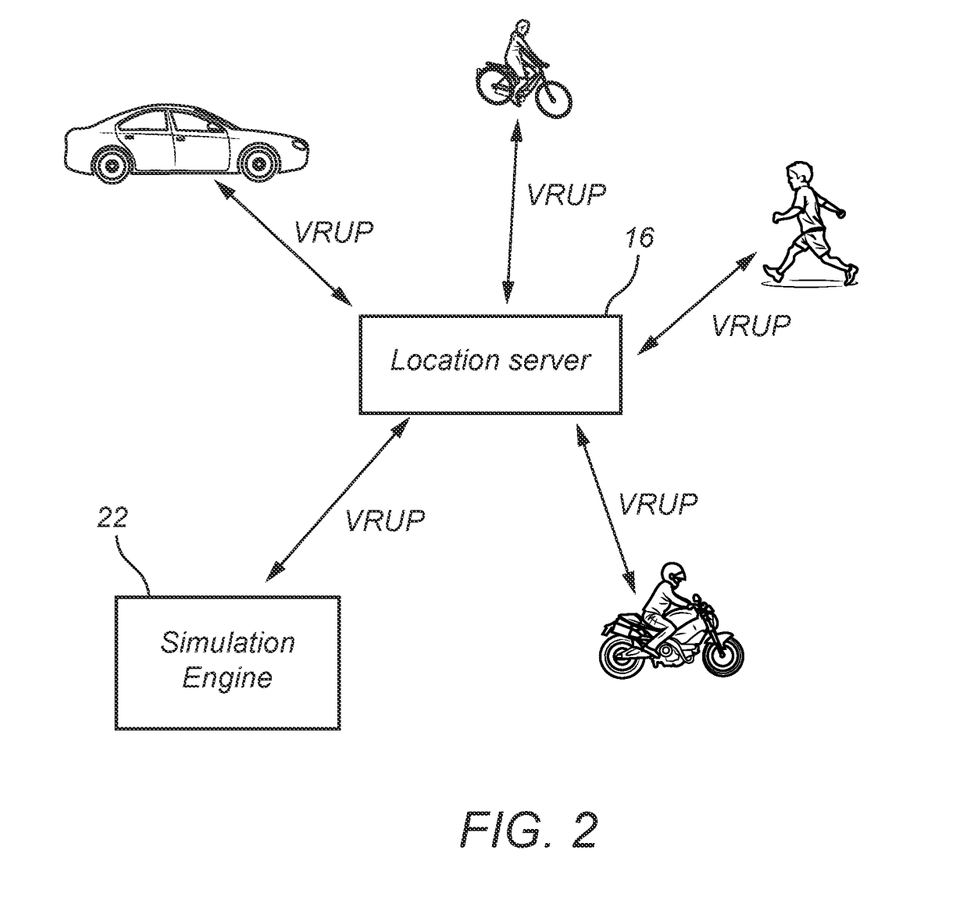
FIG. 2 is a schematic diagram illustrating the system architecture in which location server of the present disclosure is implemented, including an associated simulation engine.

FIG. 2 is a schematic diagram illustrating the system architecture in which location server 16 of the present disclosure is implemented, including an associated simulation engine 22. The system architecture consists of the location server 16 and various clients, vehicles, pedestrians, bikers, etc., as well as the simulation engine 22. The location server 16 acts as a "middle man," providing the clients with information related to potential nearby road users, which, in this context, are defined as other clients. Thus, the clients are applications running on in-vehicle infotainment systems, smart phones, smart watches, and the like. Communication is accomplished over the Internet or the like. The VRUP is utilized, potentially on top of another transport protocol. This solution is agnostic to the type of underlying network. It should be noted that, via the VRUP, a road user may be automatically categorized via hardware or the like, in terms of road user type, position, and timestamp, for example.

The simulation engine 22 is provided for testing and evaluation of alert functions specific for given road users. The VRUP is also extendable in terms of positioning system, although GPS coordinates may be utilized, other positioning means could be used equally, such as triangulation in a 5G network, etc.

The simulation engine 22 uses defined JSON data sets of location based routes to generate and simulate road users for a number of defined routes. The simulation engine 22 communicates with the location server 16 over the VRUP using the "set" method described above. This facilitates the development of alert features and makes it possible to do essential verification and testing without risking real world road users. The simulation engine is a cross-over between simulated data and real vehicles and/or road users. The following provides a simulation data example.

```
{
    "vru-simulation-data":{
        "name":"simdata-example",
        "simdata":[
            {
            "routename":"pastoria avenue",
            "gps":[{"lat":37.386339,"long":-122.040848},
                {"lat":37.384997,"long":-122.034524}],
            "vrus":[{"type":"BIKE","number":5},{"type":
                "PEDESTRIAN","number":5}]
            },
            {
            "routename":"south pastoria avenue",
            "gps":[{"lat":37.386239,"long":-122.30848},
                {"lat":37.382997,"long":-122.03433524}],
            "vrus":[{"type":"BIKE","number":2},{"type":
                "PEDESTRIAN","number":3}]
            }
        ]
    }
}
```

Figure 3:
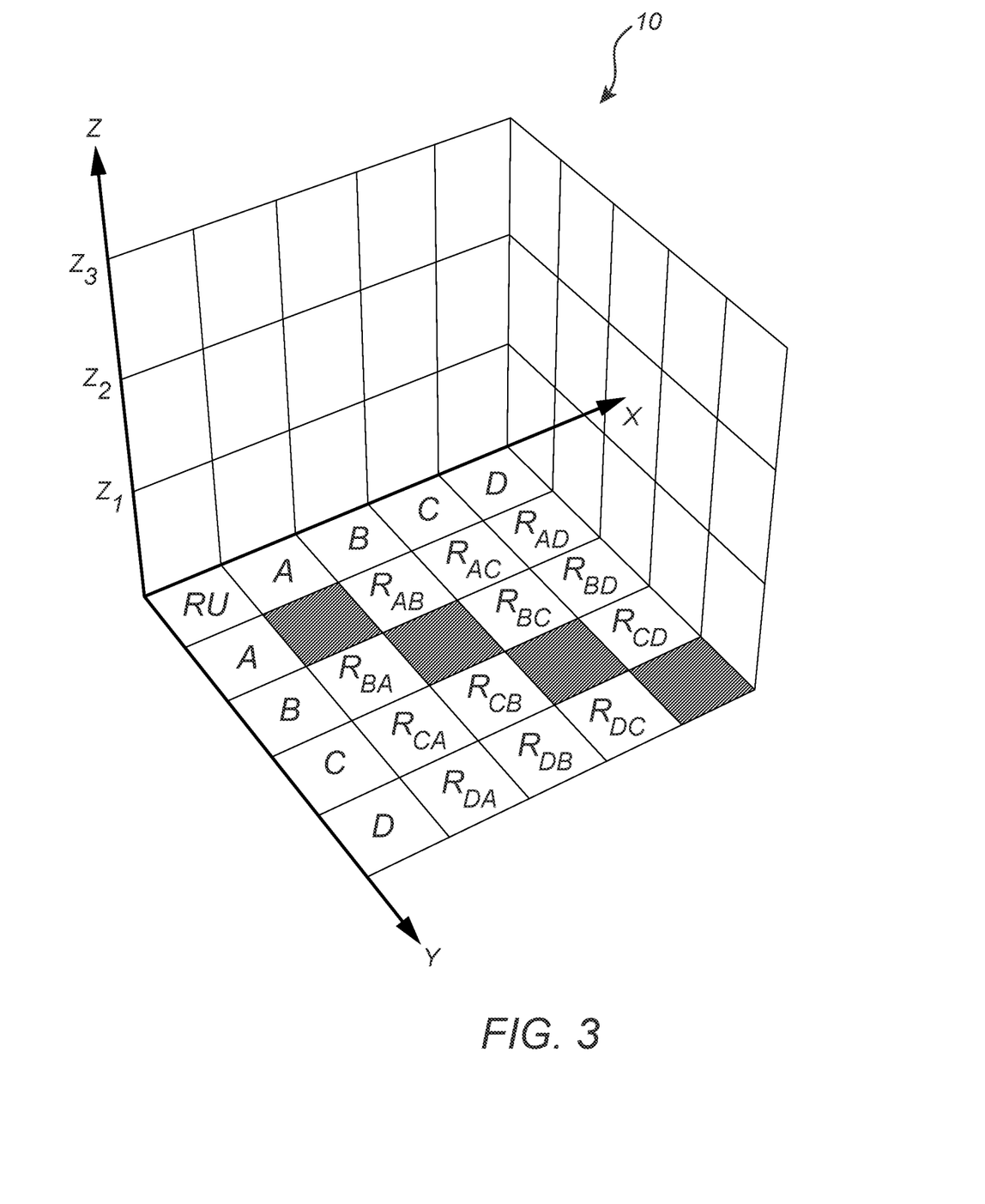
FIG. 3 is a schematic diagram illustrating one illustrative embodiment of the risk assessment module of the present disclosure.

FIG. 3 is a schematic diagram illustrating one illustrative embodiment of the risk assessment module 10 of the present disclosure, which is preferably resident on the client side. The risk assessment module 10 acts as the underlying logic for alerting different road users in the event of a potential or impending collision. Similar to warning systems in today's vehicles, the system can employ escalating alerting, ranging from a subtle haptic warning to a high risk audio and visual warning. The risk assessment module 10 helps characterize the level of alerting necessary for a given road user, and triggers an alert accordingly.

The risk assessment module 10 can take input from the VRUP, such as road user type, GPS coordinates, and timestamp, as well as other information, such as weather conditions in the area of interest and the like. FIG. 3 illustrates the risk assessment module 10 in three dimensions. In practice, there may exist more than three dimensions, but the following description is provided by way of helpful example.

Values on the z-axis of the risk assessment module 10 can either be collected via api services, so that $z_1$=weather, for example, or they may be calculated from VRUP values; e.g., $z_{2A}=\Delta gps_A*\Delta timestamp_A=velocity_A$, such that $z_{2AB}$=relative velocity between AB. The xy-plane in FIG. 3 provides the risk level, R, between every road user. In the case of the relationship between road users A and B, the corresponding R is denoted as:

$$R_{AB}=\Sigma_{ZnABKnAB},$$

where K represents the weights for every z, and can vary across different road users. This enables the system to, for example, deem a slippery road condition ($z_1$) to be more severe between vehicle A and biker B, as compared to pedestrian C and scooter D. In this example:

$z_{1AB}=z_{1CD}$; road conditions are the same for all road users, yet, $K_{1AB}>K_{1CD}$; the weights are different.

Thus, only taking $z_1$ into consideration:

$$R_{AB}>R_{CD}.$$

This concept covers methods for using derived insights from the system to analyze whether the risk assessment module 10 and its tuned values (i.e., weights, K) are sufficiently calculated to achieve optimal results. For example, one can set a desired distance threshold, λ, so that if, after the risk assessment module 10 has triggered an alert, $gps_A-gps_B<\lambda$, then the system is deemed non-optimal. Remedies for this can include manually or programmatically adjusting the risk assessment module alerting triggers or tuning the weights, K, for velocity.

In terms of the road user alerts, the present disclosure combines the use of the location server 16 and the VRUP to alert road users either using normal headphones or noise-canceling headphones or the like. The actual alert audio is generated using 3D audio playback to further enhance the alert according to the ongoing situation. Noise-cancellation is a widely used technology that uses a sound phase-inverted signal to cancel out unwanted noise. The alert consists of canceling low-frequency noise and replaying an induced audio warning pulse that also uses 3D audio. Spatial sound or 3D audio is possible through a mathematical model that simulates how sound actually enters the human ear and head. Road users, such as pedestrians and bikers, are able to take advantage of this through smart phones, connected smart watches, and the like using the VRUP over, for example, HTTP. Noise cancellation ear budscan be used in certain situations in conjunction with audio/3D audio to make the user aware of a potential danger and thereby act with caution to avoid an accident. The idea is to let vehicle and traffic audio in and to cancel out any other audio waves when a potential incident is detected by the system. Using ear buds without noise cancellation functionality, a method of an induced audio stream that uses a 3D audio library is suggested to enhance the sense of direction associated with the alert. These are types of alerts that are normally used by the visually impaired in certain situations, such as when they are jogging in vicinity of vehicles. 3D audio is possible by converting the positions provided over the VRUP. This is done using a GPS-based coordinate system herein, but the conversion could be done for any viable location based positioning system. For ear buds without noise cancellation functionality, the volume of the current audio (if any) is lowered and mixes sound with a similar audio pulse using 3D audio. Further, the present disclosure uses simulated doppler effect(s). This conversion of positions provided through the VRUP to cartesian coordinates that are then used locally to generate a rich, directional alert for a road user is illustrated conceptually in FIG. 4.

Figure 4:
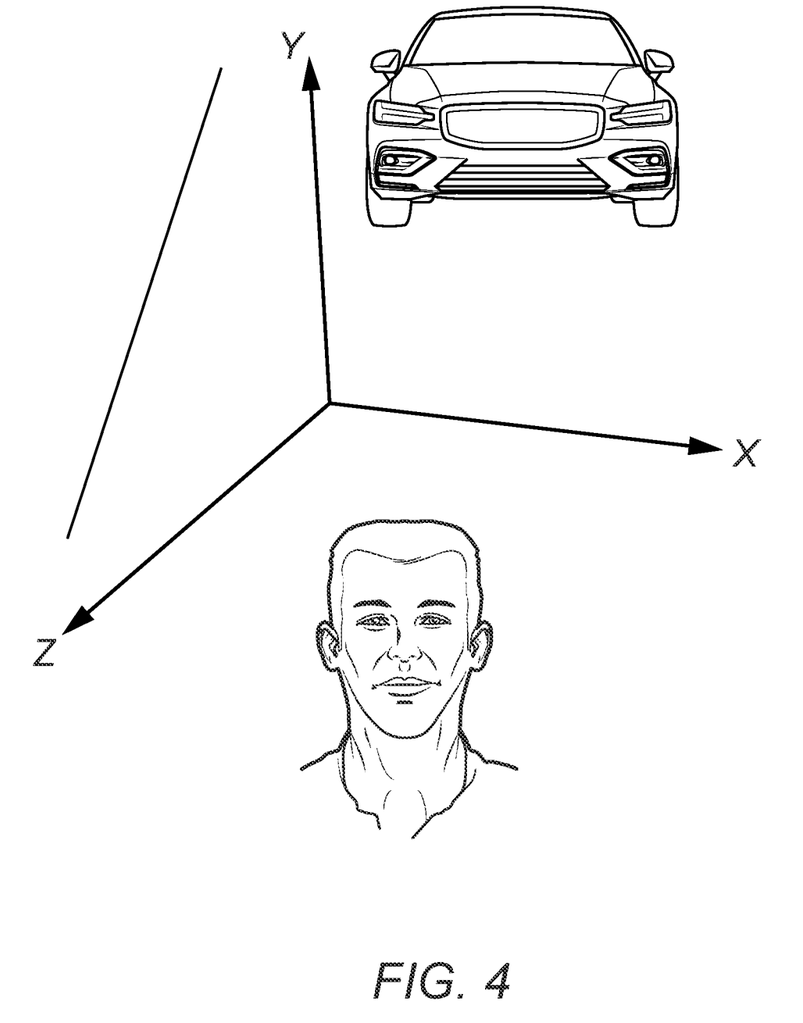
FIG. 4 is a schematic diagram conceptually illustrating the conversion of positions provided through the vulnerable road user protocol of the present disclosure to cartesian coordinates that are then used locally to generate a rich, directional alert for a road user.

Here:

$$F=x=R\cos(lat)\cos(lon)$$

$$y=R\cos(lat)\sin(lon)$$

$$z=R\sin(lat)$$

$$R=alt+6378137$$

So, by applying this formula, the vulnerable road user listener can be placed at the origin, x=0, y=0, z=0. The vehicle's cartesian coordinates can then be translated via:

$$T(x,y,z)=P_{vru}-P_{vehicle}$$

This can then be used to design the sound alert.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 5:
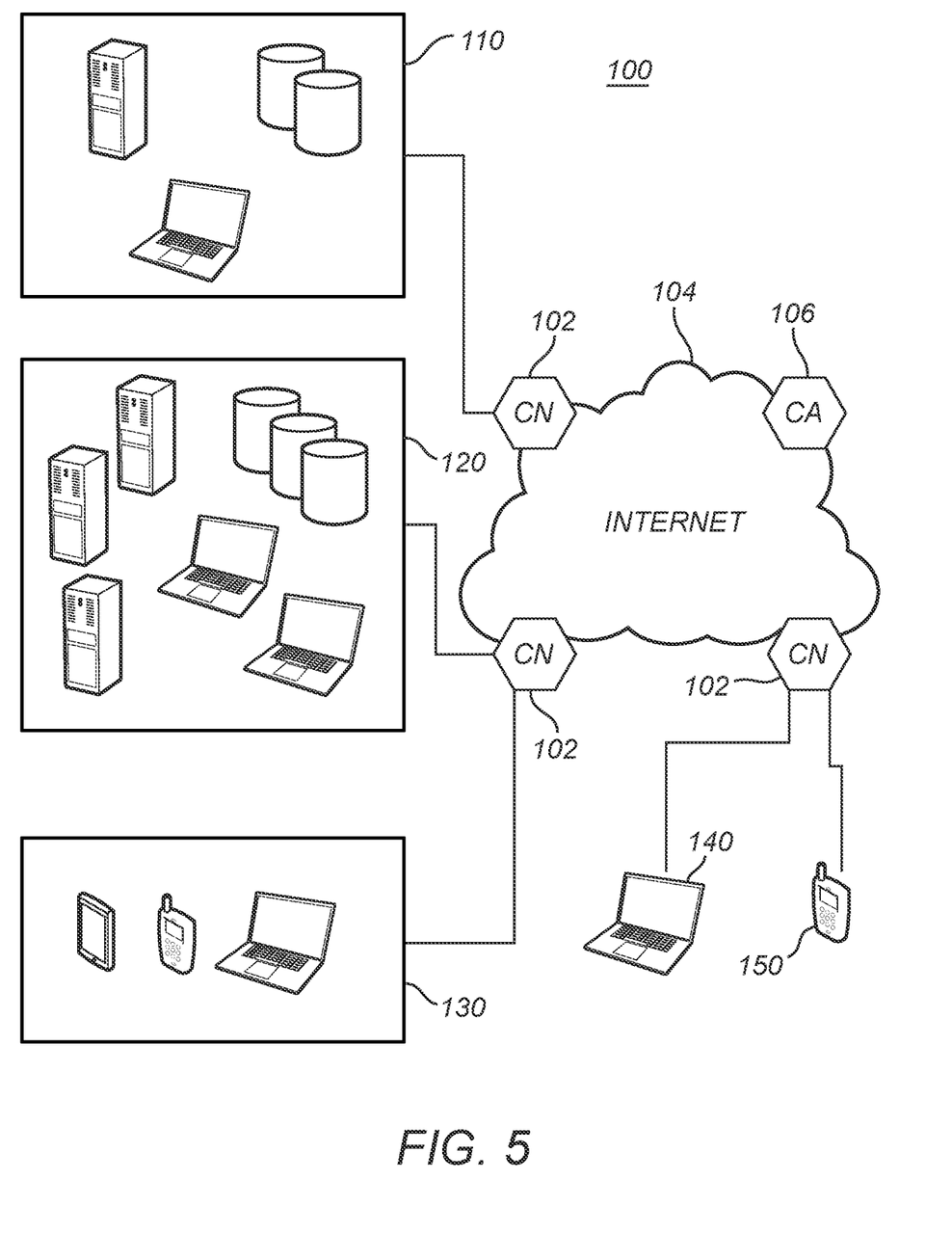
FIG. 5 is a network diagram of a cloud-based system for implementing the various algorithms and services of the present disclosure.
Figure 6:
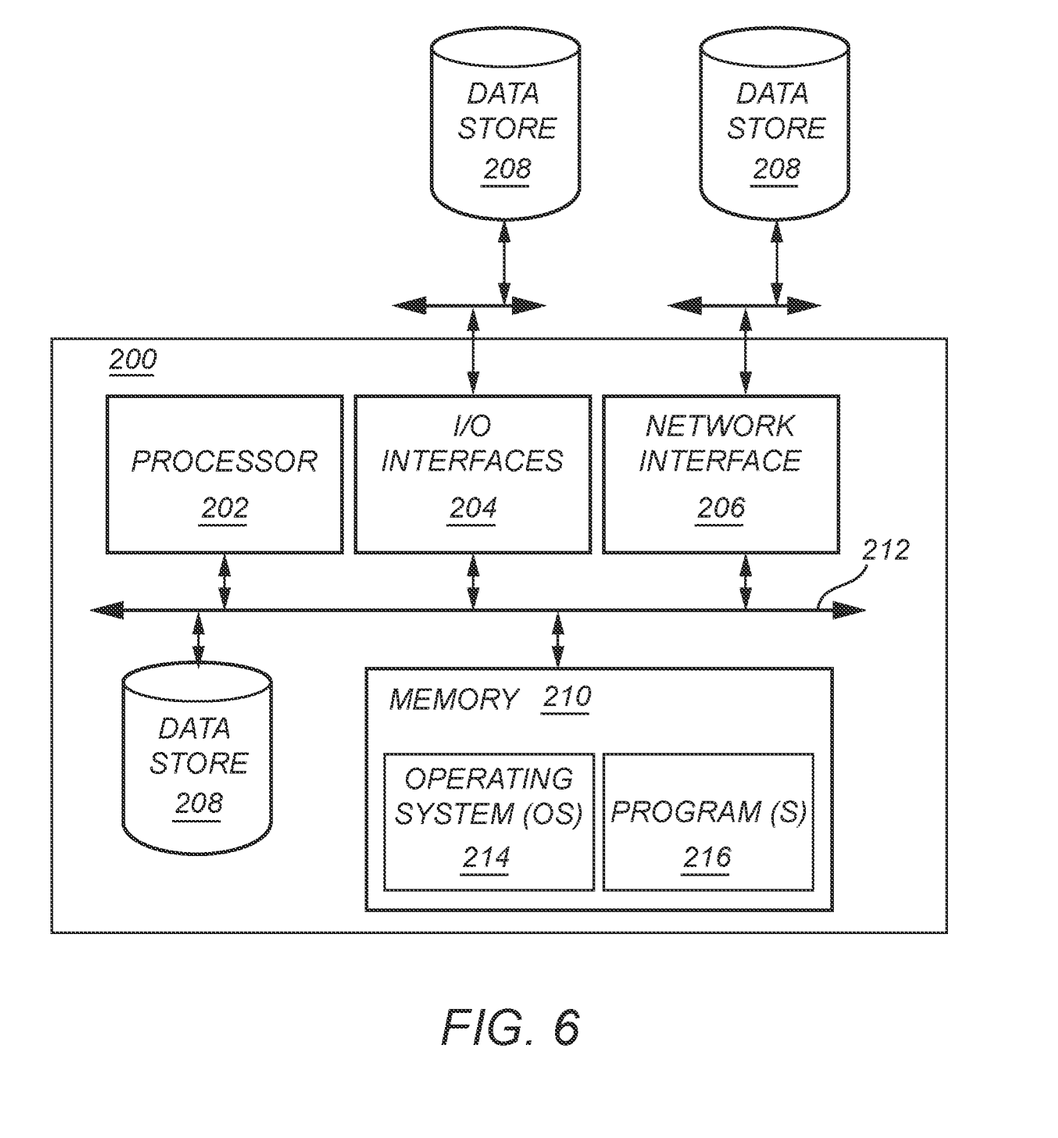
FIG. 6 is a block diagram of a server that may be used in the cloud-based system of FIG. 5 or stand-alone.

FIG. 5 is a network diagram of a cloud-based system 100 for implementing various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 6) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

Again, the cloud-based system 100 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT)

deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 6 is a block diagram of a server 200, which may be used in the cloud-based system 100 (FIG. 5), in other systems, or stand-alone. For example, the CNs 102 (FIG. 5) and the central authority nodes 106 (FIG. 5) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 5 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 5). The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 7:
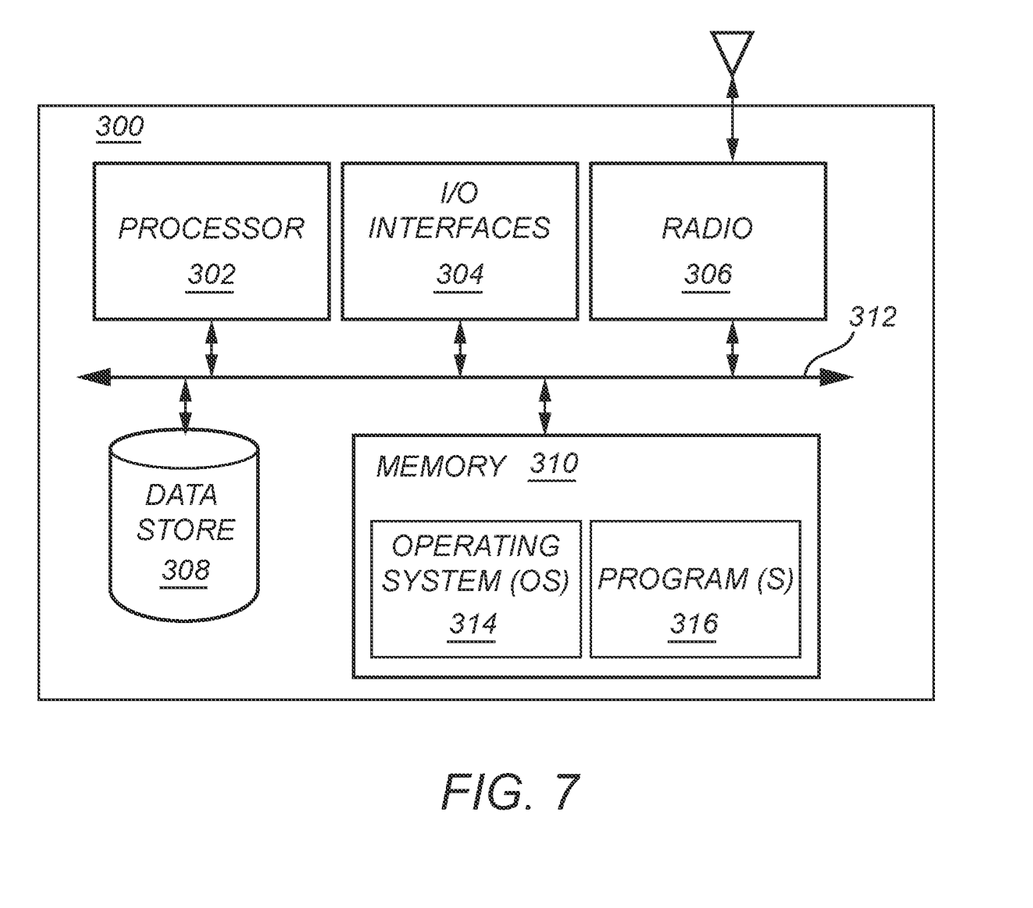
FIG. 7 is a block diagram of a user device that may be used in the cloud-based system of FIG. 5 or stand-alone.

FIG. 7 is a block diagram of a user device 300, which may be used in the cloud-based system 100 (FIG. 5), as part of a network, or stand-alone. Again, the user device 300 can be a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 6 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 7, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network, such as the cloud-based system 100 (FIG. 5).

Again, roads are a shared resource where vehicles and vulnerable road users, such as pedestrians and bikers, need to be aware of each other's proximity in order to preserve safety. The present disclosure thus provides a means to build systems that protect road users, and is particularly aimed at protecting vulnerable road users. Further, the present disclosure provides a set of tools to further develop and tailor solutions for safe road usage. The present disclosure utilizes location based data—exemplified by GPS coordinates—as the foundation for position identification in time. However, it should be understood that these GPS coordinates could be replaced by any other positioning identifier. The present disclosure provides a location based server together with a VRUP, whereby road users communicating using the VRUP can be made aware of potential dangers within their proximity. The VRUP avoids the use of global VINs and does not need persistent storage, thereby mitigating location based privacy concerns. Further, the present disclosure provides a "hybrid" simulation engine that, in conjunction with the location based server and by adopting the VRUP, can be used to tailor specific road user alerts. This simulation engine is essential to developing such systems in a safe and controlled manner. The present disclosure further specifies a risk assessment module that acts as a logic for quantifying the risk level associated with each unique road user relationship. Finally, the present disclosure provides an alert methodology for certain vulnerable road users based on noise-cancelling headphone and 3D audio algorithm technologies.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method for distributing road user information, comprising:
   at a central server, requesting and receiving road user type, road user position, and timestamp data from a road user via a protocol that omits road user identification information; and
   at the central server, receiving a request from another road user for a list of road users within a predetermined distance of a position of the another road user via the protocol that omits road user identification information and distributing the received road user type, road user position, and timestamp data from the road user to the another road user via the protocol that omits road user identification information;
   wherein the protocol that omits road user identification information uses a format that comprises only the road user type, road user position, and timestamp data such that the protocol that omits road user identification information anonymizes the road user to both the central server and the another road user and enables persistent storage and dissemination of the road user type, road user position, and timestamp data without storage and dissemination of the road user identification, wherein such road user identification information is not available to either the central server or the another road user via the protocol that omits road user identification information; and
   wherein the protocol that omits road user identification information is a vulnerable road user protocol (VRUP) that is agnostic of transport type and that uses a set command that only provides the central server with the road user type, road user position, and timestamp data as a return from the road user and a get command that upon request both provides the central server with the position of the another road user and returns the list of road users within the predetermined distance of the position of the another road user such that additional replies are avoided aside from the set command and the get command.

2. The method of claim 1, wherein the protocol that omits road user identification information is carried via another protocol over an established network.

3. The method of claim 1, wherein the road user comprises one of a vehicle, a device associated with a pedestrian, and a device associated with a biker.

4. The method of claim 1, wherein the road user position data comprises one of global positioning system coordinates and network triangulation data.

5. The method of claim 1, further comprising combining the road user type, road user position, and timestamp data with other road user type, road user position, and timestamp data to simulate an impact alert scenario.

6. The method of claim 1, further comprising using the road user type, road user position, and timestamp data received by the another road user to perform a local impact risk assessment and issue a corresponding local alert.

7. A method for performing an impact risk assessment using road user information, comprising:
   at a vehicle or device, requesting and receiving road user type, road user position, and timestamp data for a plurality of road users within a predetermined distance of a position of the vehicle or device from a central server via a protocol that omits road user identification information; and
   locally, at the vehicle or device, determining a risk of impact between each of the plurality of road users and the vehicle or device using the road user type, road user position, and timestamp data for the plurality of road users and the position of the vehicle or device;
   wherein the protocol that omits road user identification information uses a format that comprises only the road user type, road user position, and timestamp data such that the protocol that omits road user identification information anonymizes the plurality of road users to both the central server and the vehicle or device, wherein such road user identification information is not available to either the central server or the vehicle or device via the protocol that omits road user identification information; and
   wherein the protocol that omits road user identification information is a vulnerable road user protocol (VRUP) that is agnostic of transport type and that uses a set command that only provides the central server with the road user type, road user position, and timestamp data as a return from the road user and a get command that upon request both provides the central server with the position of the another road user and returns the list of road users within the predetermined distance of the position of the another road user such that additional replies are avoided aside from the set command and the get command.

8. The method of claim 7, further comprising:
   at the vehicle or device, receiving one or more of road condition and weather information for an area comprising the plurality of road users; and
   locally, at the vehicle or device, determining the risk of impact between each of the plurality of road users and the vehicle or device using the road user type, road user position, and timestamp data, the one or more of the road condition and weather information, and the position of the vehicle or device.

9. The method of claim 7, further comprising locally, at the vehicle or device, determining a risk of impact between combinations of the plurality of road users using the road user type, road user position, and timestamp data.

10. The method of claim 7, wherein the protocol that omits road user identification information is carried via another protocol over an established network.

11. The method of claim 8, wherein the device comprises one of a device associated with a pedestrian and a device associated with a biker.

12. The method of claim 7, wherein the road user comprises one of a vehicle, a device associated with a pedestrian, and a device associated with a biker.

13. The method of claim 7, wherein the road user position data comprises one of global positioning system coordinates and network triangulation data.

14. The method of claim 7, further comprising, based on a result of the determining the risk of impact, issuing a corresponding local alert at the vehicle or device warning of an impending impact.

15. A method for issuing an impending impact alert using road user information, comprising:
  at a vehicle or device, requesting and receiving road user type, road user position, and timestamp data for a plurality of road users within a predetermined distance of a position of the vehicle or device from a central server via a protocol that omits road user identification information; and
  locally, at the vehicle or device, determining a risk of impact between each of the plurality of road users and the vehicle or device using the road user type, road user position, and timestamp data for the plurality of road users and the position of the vehicle or device; and
  based on a result of the determining the risk of impact, issuing a corresponding local alert at the vehicle or device warning of an impending impact;
  wherein the protocol that omits road user identification information uses a format that comprises only the road user type, road user position, and timestamp data such that the protocol that omits road user identification information anonymizes the plurality of road users to both the central server and the vehicle or device, wherein such road user identification information is not available to either the central server or the vehicle or device via the protocol that omits road user identification information; and
  wherein the protocol that omits road user identification information is a vulnerable road user protocol (VRUP) that is agnostic of transport type and that uses a set command that only provides the central server with the road user type, road user position, and timestamp data as a return from the road user and a get command that upon request both provides the central server with the position of the another road user and returns the list of road users within the predetermined distance of the position of the another road user such that additional replies are avoided aside from the set command and the get command.

16. The method of claim 15, further comprising:
  at the vehicle or device, receiving one or more of road condition and weather information for an area comprising the plurality of road users; and
  locally, at the vehicle or device, determining the risk of impact between each of the plurality of road users and the vehicle or device using the road user type, road user position, and timestamp data, the one or more of the road condition and weather information, and the position of the vehicle or device.

17. The method of claim 15, wherein one or more of an audio characteristic and a visual characteristics of the local alert is/are provided with one or more of a directionality indicator and an urgency indicator based on the received road user type, road user position, and timestamp data for the plurality of road users.

18. The method of claim 1, further comprising, at a simulation engine, requesting and receiving the road user type, road user position, and timestamp data for the road user from the central server via the protocol that omits road user identification information and using the road user type, road user position, and timestamp data for the road user in a traffic and alert simulation for a predetermined route.

19. The method of claim 7, further comprising, responsive to a request from the central server via the protocol that omits road user identification information, reporting road user type, road user position, and timestamp data for the vehicle or device to the central server via the protocol that omits road user identification information.

20. The method of claim 15, further comprising, responsive to a request from the central server via the protocol that omits road user identification information, reporting road user type, road user position, and timestamp data for the vehicle or device to the central server via the protocol that omits road user identification information.

* * * * *